(12) United States Patent
Meiseles

(10) Patent No.: US 7,013,594 B1
(45) Date of Patent: Mar. 21, 2006

(54) PIVOTING SPLIT SHOT ATTACHMENT AND REMOVAL TOOL

(76) Inventor: Steven H. Meiseles, 110 Powder Mill Rd., Morris Plains, NJ (US) 07950-1411

( * ) Notice: Subject to any disclaimer, the term of this patent is extended or adjusted under 35 U.S.C. 154(b) by 0 days.

(21) Appl. No.: 11/237,732

(22) Filed: Sep. 29, 2005

Related U.S. Application Data

(63) Continuation-in-part of application No. 10/935,121, filed on Sep. 8, 2004.

(60) Provisional application No. 60/641,768, filed on Jan. 7, 2005.

(51) Int. Cl.
*A01K 95/02* (2006.01)
(52) U.S. Cl. .................. 43/4; 43/44.89; 7/106
(58) Field of Classification Search ............ 43/4, 43/44.89; 7/106; 30/120.1, 120.2
See application file for complete search history.

(56) References Cited

U.S. PATENT DOCUMENTS

| | | | | |
|---|---|---|---|---|
| 838,920 | A * | 12/1906 | Varnedoe ................. | 7/106 |
| 2,571,819 | A * | 10/1951 | Boel et al. ................ | 7/106 |
| 2,603,992 | A * | 7/1952 | Brown et al. ............. | 43/4 |
| 2,618,994 | A * | 11/1952 | Frazee ..................... | 72/325 |
| 2,622,462 | A * | 12/1952 | Poetker .................... | 7/106 |
| 2,653,332 | A * | 9/1953 | Precious .................. | 7/106 |
| 2,656,746 | A * | 10/1953 | Glass, Jr. et al. ........ | 81/367 |
| 2,723,403 | A * | 11/1955 | Miller ...................... | 7/106 |
| 2,736,026 | A * | 2/1956 | Belokin, Jr. ............. | 43/44.89 |
| 2,753,741 | A * | 7/1956 | Riley ....................... | 7/106 |
| 2,765,686 | A * | 10/1956 | Deline ..................... | 43/44.89 |
| 2,765,687 | A * | 10/1956 | Stanfield .................. | 43/44.89 |
| 2,790,341 | A * | 4/1957 | Keep et al. ............... | 43/44.89 |
| 2,806,229 | A * | 9/1957 | Pletz ........................ | 7/132 |
| 2,842,993 | A * | 7/1958 | Thomas ................... | 43/44.89 |
| 2,844,980 | A * | 7/1958 | Johnson ................... | 72/416 |
| 2,853,722 | A * | 9/1958 | Puzine ..................... | 7/106 |
| 2,920,514 | A * | 1/1960 | McKeehan et al. ...... | 7/106 |
| 2,961,670 | A * | 11/1960 | Frame ...................... | 7/106 |
| 3,003,376 | A * | 10/1961 | Macy et al. .............. | 7/106 |
| 3,070,815 | A * | 1/1963 | Marr ........................ | 7/106 |
| 3,094,717 | A * | 6/1963 | Gabbert ................... | 7/106 |
| 3,153,959 | A * | 10/1964 | Scoville ................... | 72/71 |
| 3,162,869 | A * | 12/1964 | Friedell ................... | 7/106 |
| 3,172,319 | A * | 3/1965 | Stanfield .................. | 7/106 |
| 3,330,025 | A * | 7/1967 | Williams ................. | 7/106 |
| 3,371,400 | A * | 3/1968 | Edes ........................ | 29/817 |
| 3,447,173 | A * | 6/1969 | Kleiman .................. | 7/106 |
| 3,581,424 | A * | 6/1971 | Bloom ..................... | 43/4 |

(Continued)

FOREIGN PATENT DOCUMENTS

EP       432554 A1 *   6/1991

(Continued)

*Primary Examiner*—Darren W. Ark
(74) *Attorney, Agent, or Firm*—Thomas J. Germinario, Esq.

(57) ABSTRACT

A fishing tool is designed to attach and remove split shot to/from fishing line. The tool comprises a top member, which is a flexible bowed strip of spring metal, pivotally connected to a base member, which is a rigid strip of sheet metal. The top member comprises a plier end and a prying end, either of which can be pivoted into alignment with the working end of the base member. Split shot is attached by threading line through the split and securing the shot in a splayed groove in the working end of the base member. Manual pressure applied to the split shot by the plier end causes it to close around the line. Split shot is removed from a line by placing the attached shot in the splayed groove and exerting downward pressure on the prying end, which penetrates the split in the shot and pries it open.

3 Claims, 1 Drawing Sheet

U.S. PATENT DOCUMENTS

| | | | | |
|---|---|---|---|---|
| 3,597,775 A | * | 8/1971 | McCasland | 7/106 |
| 3,641,654 A | * | 2/1972 | Wheeler | 29/34 R |
| 3,825,961 A | * | 7/1974 | Klein | 7/106 |
| 3,914,976 A | * | 10/1975 | Karr | 72/339 |
| 4,029,346 A | * | 6/1977 | Browning | 289/17 |
| 4,050,176 A | * | 9/1977 | Asper | 24/561 |
| 4,057,863 A | * | 11/1977 | Bewley | 7/106 |
| 4,136,548 A | * | 1/1979 | Dippold | 7/106 |
| 4,144,605 A | * | 3/1979 | Eberhardt | 7/106 |
| 4,208,749 A | * | 6/1980 | Hermann et al. | 7/106 |
| 4,377,027 A | * | 3/1983 | Price | 43/44.89 |
| 4,484,368 A | * | 11/1984 | Thompson | 7/106 |
| 4,631,855 A | * | 12/1986 | Ader | 7/106 |
| 4,651,462 A | * | 3/1987 | Nakagawa | 7/106 |
| 4,796,318 A | * | 1/1989 | Bigej | 7/106 |
| 4,899,482 A | * | 2/1990 | Gerdes | 43/4 |
| 5,136,744 A | * | 8/1992 | Allsop et al. | 43/4 |
| D332,651 S | * | 1/1993 | Sugerman | D22/149 |
| 5,207,012 A | * | 5/1993 | Lael | 43/4 |
| 5,207,014 A | * | 5/1993 | Panella | 43/4 |
| 5,425,193 A | * | 6/1995 | Gelb | 43/4 |
| 5,475,941 A | * | 12/1995 | Moore | 43/4 |
| 5,491,856 A | * | 2/1996 | Legg | 7/106 |
| 5,557,874 A | * | 9/1996 | Pietrandrea et al. | 43/4 |
| 5,850,649 A | * | 12/1998 | Simpson | 7/106 |
| 5,930,888 A | * | 8/1999 | Ball et al. | 29/817 |
| 5,960,504 A | * | 10/1999 | Dougherty | 43/4 |
| 6,477,803 B1 | * | 11/2002 | Casagram | 43/43.12 |
| 2002/0017048 A1 | * | 2/2002 | Lam | 43/4 |
| 2005/0150150 A1 | * | 7/2005 | Yabusaki | 43/4 |

FOREIGN PATENT DOCUMENTS

| | | | | |
|---|---|---|---|---|
| EP | 1198987 A1 | * | 4/2002 | |
| FR | 2547983 A1 | * | 1/1985 | |
| FR | 2617375 A1 | * | 1/1989 | |
| GB | 2183197 A | * | 6/1987 | |
| GB | 2322780 A | * | 9/1998 | |
| GB | 2377151 A | * | 1/2003 | |
| GB | 2394157 A | * | 4/2004 | |
| JP | 6-284843 A | * | 10/1994 | |
| JP | 8-80146 A | * | 3/1996 | |
| JP | 2000-342143 A | * | 12/2000 | |
| JP | 2002-150 A | * | 1/2002 | |
| JP | 2003-189774 A | * | 7/2003 | |
| JP | 2004-329054 A | * | 11/2004 | |

* cited by examiner

PIVOTING SPLIT SHOT ATTACHMENT AND REMOVAL TOOL

CROSS REFERENCES TO RELATED APPLICATIONS

This application is a continuation-in-part of application Ser. No. 10/935,121, filed Sep. 8, 2004, and claims the benefit of the filing date of Provisional Application No. 60/641,768, filed Jan. 7, 2005.

BACKGROUND OF THE INVENTION

In fishing, particularly in freshwater fly fishing, a fisherman needs to attach split shot, usually composed of lead or tin, to the fishing line to add weight so that the line and attached fly will submerge. A typical split shot is spherical in shape with a central split dividing it into two hemispheres. The shot is attached to a fishing line by inserting the line into the split and crimping the split closed around the line. As water conditions, depth and current speed change, the fisherman must add or remove split shot, which is available in various sizes, in order to adjust the weight of the line to achieve the correct depth of float. When adding split shot to a line, a fisherman will often crimp the shot closed with his teeth. Alternately, a fisherman may crimp the shot by squeezing it between his fingers or using pliers.

Using one's teeth as a crimping tool entails risks of dental injury and toxic hazards associated with ingestion of heavy metals, particularly lead. Squeezing the split shot between one's fingers often does not result in a tight closure due to the softness of the fingers and the discomfort associated with applying digital pressure to a hard protruding surface. Since a fisherman will typically attach the split shot with one hand while he holds his fishing rod in the other, conventional pliers are problematic, since they require the use of both hands—one to hold the shot and the other to operate the pliers.

When water conditions require the fisherman to reduce the weight on the fishing line, some of the split shot must be removed. This operation requires that the split in the shot be pried open again or that the shot be cut through the middle to release it from the line. Again, a fisherman will often use his teeth to pry open the split shot, with the same attendant risks associated with closing the shot in this manner. Use of the fingernails to pry the shot open is frequently ineffective and also involves risk of broken fingernails as well as discomfort. The use of a knife or other sharp tool to pry open split shot or cut it—like the use of pliers for closing the shot—requires the use of two hands. Moreover, in the slippery wet environment of fishing, there is a heightened risk of injury associated with the use of knives.

Consequently, there is a need for a fishing tool capable of effectively attaching and detaching split shot to/from a fishing line. Optimally such a tool would be compact, accessible, easy to use and operable with one hand, and its use in the fishing environment would not involve significant risks of injury to the fisherman. Much of the prior art in this area involves some variation of a plier-type design. This category takes in most of the older art, such as McKeehan, U.S. Pat. No. 2,920,514 (January 1960), Stanfield, U.S. Pat. No. 3,172,319 (March 1965), Hermann, U.S. Pat. No. 4,208,749 (June 1980), Bigej, U.S. Pat. No. 4,796,318 (January 1989), as well as some of the more recent patents, such as Lael, U.S. Pat. No. 5,207,012 (May 1993), and Simpson, U.S. Pat. No. 5,850,649 (December 1998). A slight variation on this same design involves a modified hemostat tool, as disclosed by Pietrandrea, U.S. Pat. No. 5,557,874 (September 1996). All of these tools, however, share the disadvantage of requiring the use of both hands in order to be operated safely and effectively.

The second major category of the prior art in this field consists of combination sinker attachment/dispenser tools, such as Belokin, U.S. Pat. No. 2,736,026 (February 1956), Stanfield, U.S. Pat. No. 2,765,687 (October 1956), Thomas, U.S. Pat. No. 2,842,993 (July 1955), Johnson, U.S. Pat. No. 2,844,980 (April 1956), Edes, U.S. Pat. No. 3,371,400 (March 1968), Dippold, U.S. Pat. No. 4,136,548 (January 1979), Price, U.S. Pat. No. 4,377,027 (March 1983), and Ball, U.S. Pat. No. 5,930,888 (August 1999). With the exception of Dippold and Ball, however, these tools are not capable of reopening the split shot, and none of them is readily operable with one hand. Moreover, the mechanical complexity of these tools compromises their compactness, ease of use and reliability in the field.

While one reference, Casagram, U.S. Pat. No. 6,477,803 B1 (November 2002), does disclose a simple, compact tool for opening split shot, this reference still does not satisfy the identified need because it lacks the function of also closing the split shot, and its operation requires both hands.

For the foregoing reasons, there remains a need, not satisfactorily addressed by the prior art, for a split shot fishing tool which effectively, safely and reliably performs both split shot attachment and removal, yet is also compact, easy to use, and operable with one hand. Since fisherman, particularly fly fishermen, need to be able to access their tools quickly, there is also a great advantage to a tool which is attachable to the fisherman's vest or "zinger" and thus can be readily deployed without going to the tackle box or reaching into a pocket.

SUMMARY OF THE INVENTION

The present invention is directed to a tool that safely, effectively and reliably performs the attachment and removal of split shot to/from fishing line and is also compact, accessible, easy to use, and operable with one hand. The use of flexible spring metal in the moving parts of the tool enables an economical and simple design—similar to that of a nail clipper—which is well suited to single-handed operation. The light weight compactness of the tool allows it to be accessed, handled and stored more easily than the more mechanically complicated and cumbersome fishing tools, such as pliers. The economical compact design also makes this tool ideal for attaching to a fisherman's vest or "zinger", so that it is always available at his fingertips.

A pivoting split shot attachment and removal tool having features of the present invention accommodates the two principle functions of split shot attachment and removal in a single integrated design. The mechanisms for performing these two principle functions are positioned on the opposite ends of the long, slender tool, which comprises a top member and a base member. The top member is a thin, flexible strip of spring metal having a concave shape with its ends bowed upward with respect to the base member. One side of the top member is a prying end and the other side is a plier end. The base member is a rigid strip of sheet metal having an attachment end and a working end. The top and base members are pivotally connected by a center joint at their mid-sections, such that the prying end of the top member can be pivoted into alignment with the working end of the base member and flexed downward to engage the working end of the base member, or alternately, the plier end of the top member may be pivoted into alignment with the working end of the base member and flexed downward to engage the working end of the base member.

The prying end of the top member terminates in a prying tool, which is wedge-shaped with its edge extending downward toward the base member. The edge of the prying tool is sharp enough to penetrate the split in the shot, but not sharp enough to cut the fishing line. The prying end can be pivoted about the center joint so as to align with the working end of the base member. Manual pressure exerted downward on the prying end causes it to bend such that the prying tool engages the working end of the base member. Where the prying tool engages the base member, there is a splayed groove in the working end, which splayed groove is sized to hold split shot of various sizes. In the preferred embodiment, the surfaces of the splayed groove and the working end of the base member have a roughened or ridged texture to reduce slippage of the split shot and provide a more secure grip for the user's fingers.

The undersurface of the plier end to the top member serves as a plier tool. The plier end can be pivoted about the center joint so as to align with the working end of the base member. Manual pressure exerted downward on the plier end causes it to bend such that the plier tool engages the working end of the base member at the splayed groove. In the preferred embodiment, the surfaces of the plier end have a roughened texture to reduce slippage of the split shot and provide a more secure grip for the user's fingers.

Split shot is attached to a fishing line by pivoting the plier end about the center joint so as to align it with the working end of the base member. The line is threaded through the split and the split shot is inserted into the splayed groove in the working end of the base member. Using the thumb and fore finger in opposition, the user applies manual pressure on the plier end of the top member and the working end of the base member. The split shot is compressed between the plier tool and the splayed groove, which causes the split in the shot to close around the fishing line, thus securing the split shot to the line.

Split shot is removed from a fishing line by pivoting the prying end about the center joint so as to align it with the working end of the base member. The split shot is placed with the split facing upward in the splayed groove in the working end. Using the thumb and fore finger in opposition, the user applies manual pressure on the working end of the base member and the prying end of the top member, causing the spring metal of the prying end to flex toward the split shot. The wedge-shaped prying tool penetrates the split in the shot and pries it open, thereby releasing grip of the split shot on the fishing line.

A means of attaching the tool to a fisherman's vest or "zinger" is provided in the attachment end of the base member, thus taking advantage of the compact design of the tool to make it readily accessible at all times to the fisherman. The attachment means may consist of a hole drilled or punched in the attachment end of the base member.

In the preferred embodiment, the prying end of the top member is flared to provide a greater width for contact with the split shot.

DESCRIPTION OF THE INVENTION

Figure 1:
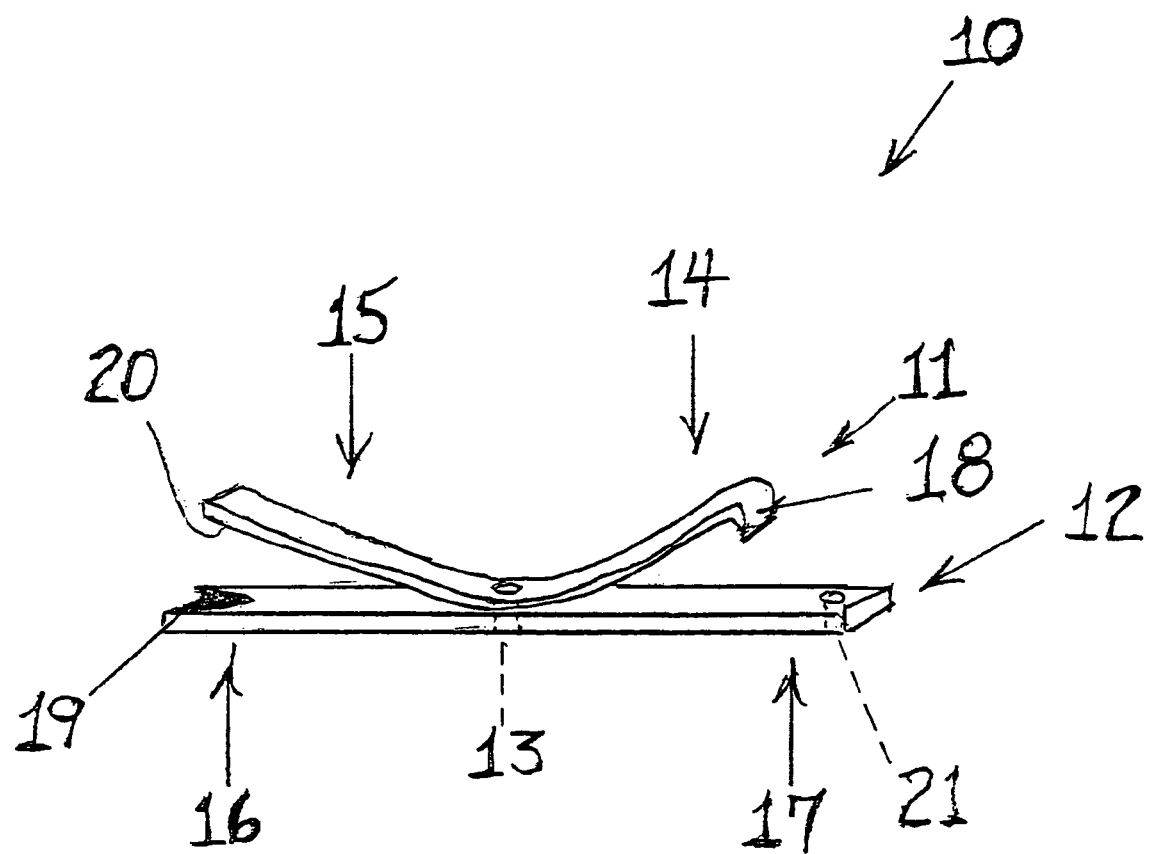
FIG. 1 is a perspective view of a pivoting split shot attachment and removal device embodying features of the present invention.

As shown in FIG. 1, a pivoting split shot attachment and removal tool having the features of the present invention 10 comprises a top member 11 and a base member 12, which are connected at their respective midsections by a center joint 13 about which the top member 11 may pivot. The center joint 13 may comprise a rivet or other equivalent pivotal connecting means. The top member 11 comprises a thin, flexible strip of spring metal with a concave shape, the ends of which bow upward in relation to the base member 12. The base member 12 comprises a rigid strip of sheet metal, such as stamped aluminum. The top member 11 has a prying end 14 and a plier end 15, while the base member 12 has a working end 16 and an attachment end 17. The center joint 13 pivotally connects the top member 11 and the base member 12, such that either the prying end 14 or the plier end 15 can be pivoted into alignment with the working end 16, and either can then be flexed downward to engage the working end 16. In the preferred embodiment, the surfaces of the working end 16 have a roughened or ridged texture to reduce slippage of the split shot and provide a more secure grip for the user's fingers.

The plier end 15 has a plier tool 20 comprising the undersurface of the plier end 15, such that when it is pivoted into alignment with the working end 16 and manual pressure is exerted downward on the plier end 15, it bends, causing the plier tool 20 to engage the working end 16. In the area where the plier tool 20 engages the working end 16 is located a splayed groove 19 in the working end 16, which splayed groove 19 is sized to secure in place split shot of various diameters.

In the preferred embodiment, the surfaces of the plier end 15 have a roughened or ridged texture to reduce slippage of the split shot and provide a more secure grip for the user's fingers. Split shot (not shown) is attached to a fishing line (not shown) by threading the line through the split and inserting the split shot into splayed groove 19. With the split shot thus secured in the base member 12, manual pressure is applied downward on the plier end 15, causing the spring metal to flex downward. The split shot is compressed between the plier tool 20 and the splayed groove 19, which causes the split in the shot to close around the fishing line, thus securing the split shot to the line.

The prying end 14 terminates in a wedge-shaped appendage which forms a prying tool 18. The edge at the prying tool is sharp enough to penetrate the split in the shot, but not sharp enough to cut the fishing line. The edge of the prying tool 18 extends downward toward the base member 12, such that when manual pressure is exerted downward on the prying end 14, it bends, causing the prying tool 18 to engage the working end 16 at the splayed groove. Split shot (not shown) is removed from a fishing line (not shown) by pivoting the prying end 14 about the center joint 13 so as to align it with the working end 16 of the base member 12. The split shot is placed, with the split facing upward, into the splayed groove 19 in the working end 16. With the split shot thus positioned, manual pressure is applied downward on the prying end 14, causing the spring metal to flex downward. The descending wedge-shaped prying tool 18 penetrates the split in the shot and pries it open, thereby releasing its grip on the fishing line.

A means of attaching the tool to a fisherman's vest (not shown) or "zinger" (not shown) is provided in the attachment end of the base member 12, thus taking advantage of the compact design of the tool to make it readily accessible at all times to the fisherman. The attachment means 21 may consist of a hole drilled or punched in the attachment end of the base member 12.

In the preferred embodiment, the prying end 18 is flared to provide a greater width for contact with the split shot (not shown).

The present invention is, therefore, well adapted to satisfy the need for a fishing tool which effectively, safely and reliably performs both split shot attachment and removal, yet is also compact, readily accessible, easy to use, and operable with one hand.

While the present invention has been described is some detail with reference to certain currently preferred embodiments, other embodiments are feasible and will readily suggest themselves to those skilled in the art. Therefore, the spirit and scope of the appended claims are not limited to the description of the preferred embodiment contained herein.

What is claimed is:

1. A fishing tool comprising:
   (a) a top member comprising a thin, flexible strip of spring metal that is concave in shape and has a prying end and a plier end;
   (b) a base member comprising a rigid strip of sheet metal having an attachment end and a working end;
   (c) a center joint pivotally connecting the top member and the base member at their respective mid-sections, such that, when the prying end of the top member is pivoted into alignment with the working end of the base member, it can be flexed downward to engage the working end of the base member, and when the plier end of the top member is pivoted into alignment with the working end of the base member, it can be flexed downward to engage the working end of the base member;
   (d) a prying tool comprising a wedge-shaped appendage at the prying end, an edge of the wedge-shaped appendage extends downward toward the base member, such that, when the prying end is pivoted into alignment with the working end of the base member, manual pressure exerted downward on the prying end causes it to bend and thereby engage the working end of the base member;
   (e) a plier tool comprising an undersurface of the plier end of the top member, such that, when the plier end is pivoted into alignment with the working end of the base member, manual pressure exerted downward on the plier end causes it to bend and thereby engage the working end of the base member;
   (f) a splayed groove positioned on the working end of the base member, where the prying tool and plier tool engage the base member and sized to hold split shot of various diameters, such that when a split shot attached to a fishing line is placed in the splayed groove and manual pressure is exerted downward on the prying end, the prying tool penetrates the split in the split shot and pries it open, thereby releasing the fishing line, and such that when a split shot threaded with fishing line is inserted into the splayed groove and manual pressure is exerted downward on the plier end, the split shot is compressed between the descending plier tool and the splayed groove, which causes the split shot to close around the fishing line, thus securing the split shot to the line;
   (g) means on the attachment end of the base member for attaching the fishing tool to a fisherman's clothing or equipment, the means for attaching comprising a hole extending completely through the base member and having an axis which is parallel to an axis of the center joint.

2. The fishing tool of claim 1, wherein the prying end of the top member is flared so that the prying tool is wider than the working end of the base member.

3. The fishing tool according to either claim 1 or 2, wherein the surfaces of the working end of the base member and the plier end of the top member have a roughened or ridged texture, so as to reduce slippage of the split shot and provide a more secure grip for the user's fingers.

* * * * *